UNITED STATES PATENT OFFICE.

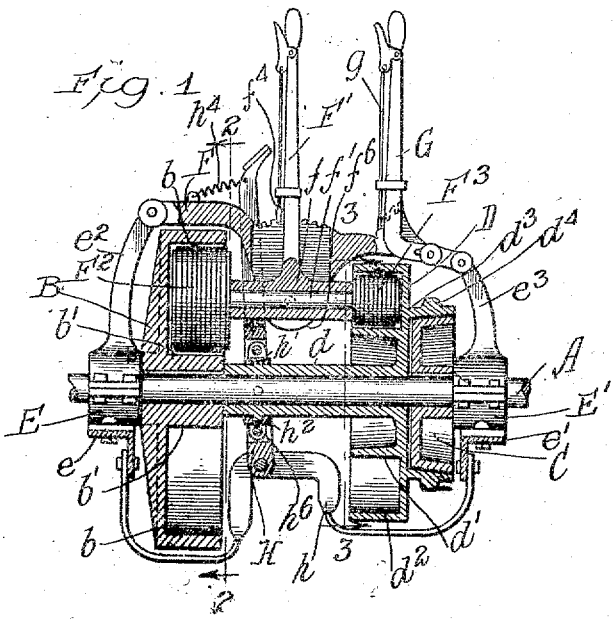
Fig. 1.
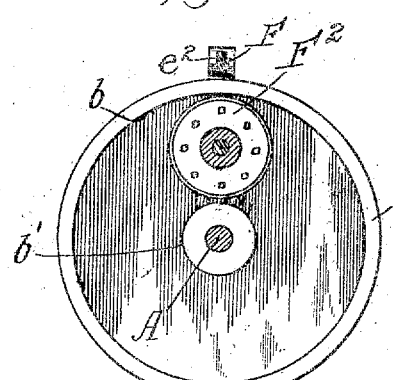
Fig. 2.
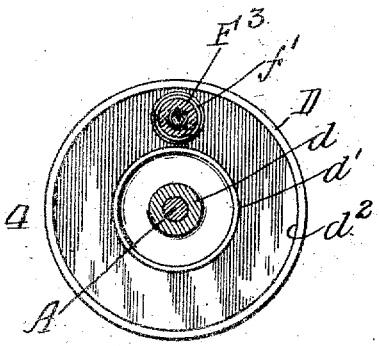
Fig. 3.
Fig. 4.

GEORGE W. MARBLE, OF CHICAGO, ILLINOIS, ASSIGNOR OF ONE-HALF TO WILLIAM R. DONALDSON, OF CHICAGO, ILLINOIS.

CHANGE-SPEED AND REVERSING MECHANISM.

No. 874,520.  Specification of Letters Patent.  Patented Dec. 24, 1907.

Application filed January 10, 1906. Serial No. 295,372.

*To all whom it may concern:*

Be it known that I, GEORGE W. MARBLE, a citizen of the United States, and a resident of the city of Chicago, in the county of Cook and State of Illinois, have invented certain new and useful Improvements in Change-Speed and Reversing Mechanisms; and I do hereby declare that the following is a full, clear, and exact description of the same, reference being had to the accompanying drawings, and to the letters of reference marked thereon, which form a part of this specification.

This invention relates to change speed and reversing mechanisms and more particularly to a frictionally operated mechanism of the class described.

Heretofore in the various frictionally operated change speed and reversing mechanisms it has been usual for the friction wheels to remain at all times in positive engagement to afford different rates of speed for the driven shaft relatively of the driving shaft and in consequence after such friction wheels have become slightly worn the same are frequently more or less noisy and consume more or less power unnecessarily.

With this in view the object of the invention is to provide a frictional mechanism of the class described wherein variations in speed both forward and reverse are secured by frictionally engaging mechanisms affording a plurality of speeds in both directions operating practically without loss of power and silently and in which the friction elements disengage when changing speed.

It is a further object of the invention to construct a device whereby the driven element couples directly with the driving shaft and obviating the slippage due to most frictionally operated devices.

The invention consists in the matters hereinafter described and more fully pointed out and defined in the appended claims.

In the drawings: Figure 1 is a central vertical section of a device embodying my invention showing the mechanism in neutral position. Fig. 2 is a section taken on line 2—2 of Fig. 1. Fig. 3 is a section taken on line 3—3 of Fig. 1. Fig. 4 is an enlarged detail of the foot lever.

As shown in the drawings: A indicates the main driving shaft upon which is rigidly keyed a balance wheel B, of any desired diameter and which is provided in one side with a concentric groove or channel having parallel walls affording an outer peripheral friction face $b$ and an inner hub friction face $b'$ as shown more fully in Fig. 2. Also rigidly secured on the shaft is a friction wheel C which as shown is opposite the grooved face of the balance wheel B and as shown is slightly tapered toward the same at its periphery. Slidably secured upon the shaft and integrally connected with an elongated sleeve $d$ through which said shaft passes is a friction wheel or disk D of smaller size than the balance wheel B. Said friction disk is provided in its inner face opposite the balance wheel with a concentric groove or track affording an inner friction face $d'$ corresponding with the hub friction face $b'$ on the balance wheel and a peripheral friction face $d^2$ corresponding with the peripheral friction face $b$ in the balance wheel. Said friction wheel D is provided on its outer face adjacent the friction wheel C with a concentric flange $d^3$ complementally shaped on its inner face with the friction wheel C and adapted to engage thereon and as shown said flange $d^3$ is shaped on its outer side to constitute a belt pulley over said friction faces and is likewise at its edge provided with sprocket teeth indicated by $d^4$ whereby a sprocket chain may be applied thereto for transmitting the power. Said shaft is journaled in suitable bearings E and E' upon the frame $e$ and $e'$ which may be of any suitable construction and, as shown, adjacent the balance wheel B, a bracket arm $e^2$ extends slightly above the periphery of said balance wheel. In a like manner extending above the friction wheel D, is a bracket arm $e^3$, rising from the bearing E'. Hinged on the upper end of the arm $e^2$ is a lever F provided with an inwardly extending boss $f^6$ at its center between said friction wheels and which is provided with an elongated vertical aperture therethrough extending longitudinally of the lever. Extending through said aperture is a lever F' at the lower end of which is provided an elongated sleeve $f$ in which is journaled a shaft $f'$ at one end of which is rigidly secured a large friction pulley F² which fits within the groove in the face of the balance wheel and is adapted for engagement with either friction face therein. At the opposite end of the shaft is secured a smaller friction pulley F³ in a like manner fitting within the groove or track in the friction wheel D. Said sleeve f is pivoted in the slot in said lever F and centrally disposed on said lever at the central part thereof is an upwardly curved and notched edge to form a segment. A spring controlled detent f⁴, is carried on said lever F' and is adapted to hold the friction pulleys in adjusted position and when retracted permits said friction pulleys to be inclined to bring the larger friction pulley into engagement with the hub of the balance wheel and the smaller friction pulley with the periphery of the friction wheel D, thus affording a slow reversing drive or by rocking the friction pulleys in opposite directions the larger friction pulley is brought into engagement with the peripheral friction face on the balance wheel while the smaller is brought into engagement with the hub of the friction wheel D thus affording more rapid reverse. Means are also provided for forcing both said friction pulleys bodily down upon the hub friction faces b' and d' and for shifting the same outwardly bringing both thereof into engagement with the peripheral friction faces b and d². For this purpose as shown the inner end of said lever is secured to the bracket arm e³ by means of a bent lever G which is fulcrumed on the end of the lever F and the other end thereof is hinged to said bracket e³. Said lever G is also provided with a spring controlled detent g as shown in Fig. 1 and engages a suitable segment and when retracted permits the lever to be swung inwardly or outwardly thus forcing the shaft f' bodily downwardly carrying the friction pulleys F² and F³ therewith or if shifted in the opposite direction elevating the same bringing said friction pulleys into engagement with the peripheral friction faces on the balance wheel and on the friction wheel D in this manner it will be seen that a relative slow speed is secured when the friction pulleys F² and F³ are shifted inwardly and a higher speed is secured when the friction pulleys are shifted outwardly.

When the friction wheel D has attained considerable speed the same is coupled with the shaft thus utilizing the direct speed of rotation of the shaft A. Means are provided for shifting the friction wheel D, outwardly and jamming the friction flange d³ thereon into engagement with the friction wheel C. For this purpose a lever H which as shown is a foot lever though not necessarily so is pivotally engaged upon a metallic strap h connected with the frame and is provided at its middle with a yoke h⁵ which engages around the sleeve d and in which is pivotally engaged a bearing ring h² grooved internally to receive a collar h' secured on said sleeve so that pressure applied to said lever acts to force said sleeve and the friction wheel D longitudinally of the shaft and the flange d³ firmly upon the friction wheel C. As shown a pulling spring h⁴ is secured on said lever and on any relatively immovable parts, as for instance the lever F, so that when pressure is removed from said lever H, the friction wheel D is immediately retracted from the friction wheel C.

The operation is as follows: The shaft A which may be considered as rotating continuously in one direction carries the balance wheel thereon at the same rate and the friction disk D being rotatably secured on said shaft rotates only when frictionally engaged. Referring to said friction disk as employed in propelling a vehicle (though obviously it may be used for any other purpose) when it is desired to start the vehicle both friction pulleys are forced downwardly or inwardly into engagement with the hub friction face h⁴ in the balance wheel and the hub friction face d' in the friction wheel D. In this manner owing to the relatively small size of the hub friction face b' as compared with the friction pulley F² a slow forward rotation is secured in the friction wheel D and a corresponding movement is imparted to the vehicle by means of a suitable sprocket chain or belt secured on the pulley face or the sprocket d⁴. Having started the vehicle, the lever G is then thrown oppositely elevating both the friction pulleys F² and F³ into engagement with the peripheral friction surfaces b and d² and accelerating the speed. Having attained a sufficient momentum the lever H is actuated to force the friction disk D longitudinally of the axle A and into engagement upon the friction wheel C and at the same moment or prior thereto the lever G is released permitting the friction pulleys F² and F³ to move to their neutral position as shown in Fig. 1. The transmission device is now adjusted in its position for full speed ahead.

Should it be desired to reverse, the foot is removed from the lever H allowing the friction wheel to retract from the friction wheel C and the lever F' is actuated to rock the shaft f' bringing either the friction pulley F² or F³ into engagement with the inner friction faces of the respective complemental members and the other thereof into engagement with the peripheral friction faces. In either event reversing the rotation of the friction wheel D and of course the sprocket d⁴. Inasmuch as there are no gears to strip this reversal can be accomplished very quickly and the friction pulleys may of course be used as brakes.

Obviously the prescribed means for actuating the friction pulleys may be varied and it is evident that if desired mechanism may be employed in connection with the same for affording additional speed ahead or reverse as desired. It is also obvious that any suitable motive power may be employed for driving the shaft A and of course the invention may be applied either as a transmission device for a vehicle or for any other purpose for which a construction of the kind is adapted. I therefore do not purpose limiting this application for patent otherwise than necessitated by the prior art as obviously many details of construction and operation may be varied without departing from the principles of my invention.

I claim as my invention:

1. A friction speed transmission device embodying a continuously rotating shaft, a wheel rigidly secured thereon having a friction face at its hub and within its periphery, an oppositely facing friction disk or wheel slidably engaged upon the shaft and having a friction face adjacent the hub and within its periphery, a shaft journaled between said disks or wheels, a friction wheel rigidly secured on each end thereof, one extending into position to engage either friction face of the rotatable friction wheel, the other to engage either friction face of the rotatable friction wheel and means for shifting said friction wheels into engagement with the respective friction faces.

2. In a friction transmission device the combination with a shaft of the balance wheel secured thereon having a friction face at the hub and a friction face within the periphery of the same, a friction wheel rotatably secured upon the shaft and facing the balance wheel, a shaft extending substantially parallel of the main shaft, a friction wheel rigidly secured on each end thereof, one of the same adapted to engage the friction faces on the balance wheel, the other to engage the rotatable friction wheel there being sprocket teeth on said rotatable friction wheel.

3. A friction transmission device embracing a main shaft, oppositely facing friction wheels thereon, one rigidly secured to the shaft, the other rotatable and slidable thereon longitudinally, a fixed friction wheel at the rear of said movable friction wheel and adapted to engage a friction face thereon when the latter is moved longitudinally, a shaft journaled substantially parallel with the main shaft, a friction wheel on each end thereof, adapted to engage both the first named fixed friction wheel and the rotatable friction wheel, means for adjusting said shaft to reverse the rotatable friction wheel on the main shaft, means for adjusting said shaft to drive said rotatable wheel at different speeds and means for shifting the rotatable friction wheel into engagement with the fixed friction wheel at the rear thereof thereby driving the rotatable wheel at the same rate of speed as the main shaft.

4. A friction transmission device embracing the combination with a rotative shaft of a balance wheel thereon having inner and outer friction faces, a friction wheel rigidly engaged on the shaft opposite said balance wheel, a transmitting friction wheel rotatable on the shaft and having sprocket teeth and inner and outer friction faces thereon oppositely disposed with reference to those on the balance wheel, a shaft journaled between said transmitting friction wheel and balance wheel, a friction pulley on each end thereof, a lever for inclining said shaft to bring said friction pulleys into engagement with one face on the balance wheel and one face on the transmitting friction wheel and means for shifting the transmitting friction wheel bodily on the shaft into positive engagement with the fixed friction wheel on said shaft.

5. In a friction transmission device the combination with the driving shaft and a balance wheel thereon having an inner and an outer friction face, of a transmission friction wheel facing the same and rotatable and longitudinally movable on the shaft and also having an inner and an outer friction face, a rotating shaft having its ends extending between said friction faces, a friction pulley on each end of said shaft, a lever for adjusting said friction pulleys to simultaneously engage one face on the balance wheel and one face on the transmission wheel, a lever for forcing said shaft bodily inwardly or outwardly to engage simultaneously corresponding friction faces on said wheels, a tapered friction wheel rigidly secured on the driving shaft behind the transmission friction wheel, said transmission friction wheel having a flange thereon provided with sprocket teeth and complemental with the tapered friction wheel and adapted to engage thereon and means for shifting the transmission friction wheel bodily on the shaft and into engagement with said fixed friction wheel.

6. In a device of the class described a transmission gear embracing a driving shaft, a pivoted shaft, a friction pulley on each end thereof, a fixed friction wheel and a rotatable friction wheel on the driving shaft having outer and inner friction faces, means forcing said friction pulleys inwardly or outwardly to simultaneously engage both the outer or both the inner faces, means including said shaft bringing one of said friction pulleys into engagement with the inner and the other with the outer friction face, a fixed friction wheel on the driving shaft adjacent the rotatable friction wheel and a lever adapted to move said rotatable friction wheel bodily on the shaft into binding engagement therewith.

7. The combination with a shaft of a balance wheel secured thereon shaped to afford an inner and an outer friction face, a driving friction wheel also secured on the shaft and tapered toward the balance wheel, a slidable and rotatable transmission friction disk engaged on the shaft between the driving friction wheel and the balance wheel, means forcing the same longitudinally of the shaft into non-slipping friction engagement with the driving friction wheel, rigidly connected friction rollers adapted to be engaged simultaneously with both outer or both inner faces or alternately an inner and an outer friction face on the balance wheel and transmission friction wheel, means for adjusting the same and a sprocket wheel integrally secured on the transmission friction wheel.

8. A speed changing mechanism comprising a driving shaft, a friction wheel rigidly secured thereon, interacting friction wheels secured on the shaft, means acting to slide said interacting friction wheels into non-slipping engagement and means for driving one of said interacting wheels from the first mentioned friction wheel.

9. The combination with a shaft of a slidable transmission wheel thereon having friction faces on one side thereof, a fixed driving friction wheel on the shaft adapted for engagement with the transmission wheel opposite said friction faces, a driving friction wheel adapted to engage said friction faces and to drive the transmission either at a low or a high rate of speed and a lever for shifting the transmission wheel bodily into engagement with said first named driving friction wheel.

10. A speed changing mechanism comprising a shaft, a balance wheel rigidly secured thereon, interacting friction wheels on the shaft one of which is rigid thereon, means acting to slide the other friction wheel into non-slipping engagement with the rigid wheel thereby driving at shaft rate, a shaft parallel with said driving shaft, a friction pulley on each end thereof and means for adjusting said friction pulleys into engagement with said balance wheel and one of said interacting friction wheels.

11. In a device of the class described the combination with a main shaft of a plurality of friction wheels rigidly engaged thereon, a rotatable friction wheel journaled on said shaft, a shaft approximately parallel with the main shaft, a friction pulley on each end thereof and means for adjusting said friction pulleys to simultaneously engage one of said rigid friction wheels and said rotatable friction wheel.

12. A speed changing and reversing mechanism comprising a main driving shaft, a plurality of rigid friction wheels thereon, a rotatable friction wheel on said shaft, a shaft parallel with said driving shaft, a plurality of friction pulleys rigidly engaged thereon, means for adjusting said friction pulleys to engage one of said rigid friction wheels and said rotatable friction wheel for speed ahead and means for simultaneously adjusting said friction pulleys to engage said rigid friction wheel and rotatable friction wheel for reverse speed.

13. In a speed changing mechanism of the class described the combination with a shaft of a friction wheel on each end thereof, a sleeve revolubly engaged on said shaft and abutting against one of said friction wheels, an integral friction wheel on the opposite end of said sleeve adapted to be thrown into and out of engagement with one of the aforesaid friction wheels, a shaft, a plurality of friction pulleys engaged thereto connecting one of said first named friction wheels with said friction wheel on the sleeve and means for adjusting said pulleys for speeds ahead or reverse speeds.

14. A mechanism of the class described comprising a main shaft, a friction wheel rigidly engaged on each end thereof, one of which has a plurality of friction faces, a revoluble friction wheel engaged on said shaft between said rigid friction wheels and having a plurality of friction faces on one side thereof and a friction face on the opposite side thereof, a shaft journaled above said main shaft, a plurality of friction pulleys engaged thereon one adapted to normally engage between the faces of one of said rigid friction wheels and the other to normally engage between the friction faces of said rotatable friction wheel, means for adjusting both of said pulleys to engage corresponding faces of one of the rigid and the rotatable friction wheels, means for adjusting said pulleys to simultaneously engage a face of the rigid friction wheel and to engage a face of the rotatable friction wheel for reversing the speed and means for forcing said rotatable friction wheel into and out of engagement with one of said rigid friction wheels.

15. In a device of the class described the combination with a main shaft, of a bearing at each end thereof having upwardly extending brackets, a lever pivoted on one of said brackets, and having an outwardly extending slotted boss thereon, an adjusting lever engaged in said slot, an adjusting lever pivoted to one of said brackets and slidably connected to the first named lever, friction wheels rigidly engaged on said shaft one abutting against each bearing, a revoluble friction wheel on said shaft, a shaft parallel with said main shaft, a friction pulley engaged on each end thereof adapted to engage one of said rigid friction wheels and said revoluble friction wheel and means adapted to move the rotatable friction wheel longitudinally of the main driving shaft.

16. In a device of the class described the combination with a drive shaft of a balance wheel rigidly engaged thereon and provided with concentric friction faces, a transmission wheel rotatively engaged on said shaft and provided with concentric friction faces, a pulley between the friction faces of each wheel and operative connections between said pulleys adapted to throw them oppositely into engagement with one of said friction faces on each wheel.

17. In a device of the class described the combination with a balance wheel and a transmission wheel, each having a plurality of concentric friction faces thereon, of means for rotating the balance wheel, a friction pulley between the friction faces of each wheel and means for throwing one of said pulleys against the outer friction face of one wheel and the other against the inner friction face of the other wheel.

18. In a device of the class described the combination with a drive shaft of a balance wheel rigidly engaged thereon and a transmission wheel rotative thereon, each of said wheels having a plurality of concentric friction faces on its inner side, a friction pulley between the friction faces of each wheel, a shaft connecting said pulleys together, means for simultaneously throwing one pulley inwardly and the other outwardly into engagement with a friction face on each wheel and means for simultaneously throwing said pulleys in the same direction to engage a friction face on each wheel.

19. In a device of the class described the combination with two independently rotative friction wheels, each having a plurality of friction faces thereon, a shaft between said wheels, a friction pulley rigidly engaged on each end thereof and projecting between the friction faces of said wheels and means for adjusting said pulleys into engagement with said friction faces.

20. In a transmission device the combination with approximately parallel shafts one of which is constantly rotated, interacting friction members on said shafts adapted to be adjusted for different rates of speed ahead, a friction member rigidly engaged to the constantly rotatable shaft and means adapted to slide one of the aforesaid friction members on said constantly rotatable shaft to engage the last named friction member.

21. In a transmission device the combination with approximately parallel shafts one of which is a constantly driven shaft and interacting friction members on said shafts adapted to be adjusted to drive one of the friction members on the constantly driven shaft at different rates of reverse speed.

22. In a transmission device the combination with approximately parallel shafts one of which is adapted to be constantly driven, and friction members on said shafts adapted to contact each other to drive a friction member on the constantly driven shaft at various speeds ahead and reverse speeds.

23. In a device of the class described the combination with a rotating shaft, a friction wheel rigidly engaged thereon, a friction wheel rotatable on the shaft, a shaft adjacent said rotating shaft and friction members thereon adapted to contact with said friction wheels to transmit the motion from one to the other.

24. In a device of the class described the combination with a shaft, a plurality of friction wheels thereon, a shaft adjacent said shaft, a friction member on each end thereof adapted to contact with said friction wheels and means shifting said friction members thereby actuating one of the friction wheels at various speeds ahead and reverse speeds.

25. In a device of the class described the combination with a shaft adapted to be constantly rotated, of a friction wheel thereon, a friction wheel on said shaft movable longitudinally thereof, a shaft adjacent the aforesaid shaft, a plurality of friction members thereon adapted one to engage each friction wheel and means adapted to engage one of said friction wheels for obtaining driving shaft speed.

26. In a device of the class described the combination with a main rotatable shaft of a rock shaft adjacent the same and friction members on each shaft adapted by actuation of one of said shafts to contact for speeds ahead and reverse and means engaging one of said friction members for the purpose of obtaining driving shaft speed.

27. In a device of the class described the combination with a main rotatable shaft of inwardly facing friction wheels thereon, a shaft extending longitudinally of said main shaft, friction members thereon and means adapted to rock one of said shafts to throw said friction members and friction wheels into engagement.

28. In a device of the class described the combination with a rotatable shaft of friction wheels engaged thereon each having a plurality of faces, a shaft adjacent the rotatable shaft, a friction member on each end thereof and each extending between the faces of the adjacent friction wheels and means adapted to oscillate the friction members to contact alternate faces on said friction wheels.

29. In a device of the class described the combination with a main rotatable shaft of a plurality of friction wheels on said shaft each having a plurality of faces, a shaft journaled longitudinally of said rotatable shaft, friction members thereon adapted one to extend between the friction faces on one of said friction wheels and one to extend between the friction faces on another of said friction wheels and means adapted to oscillate said friction members for each to contact either face of its adjacent friction wheel.

30. In a device of the class described the combination with a main rotatable shaft of a plurality of friction wheels on said shaft each having a plurality of faces, a shaft journaled longitudinally of said rotatable shaft, friction members thereon adapted one to extend between the friction faces on one of said friction wheels and one to extend between the friction faces on another of said friction wheels, means adapted to oscillate said friction members for each to contact either face of its adjacent friction wheel, one of said friction wheels having a belt surface and means adapted to be engaged by one of said friction wheels to drive said friction wheel at driving shaft speed.

31. In a device of the class described the combination with a shaft of friction wheels thereon, having friction faces directed approximately parallel with the axis thereof and transmitting mechanism adapted to operatively connect said faces whereby one of said friction wheels may be driven forward and backward at various speeds.

32. In a device of the class described the combination with a driven shaft of friction wheels thereon one relatively movable with respect to the other and each having friction faces directed at an angle with the plane of rotation of said wheels and friction members operatively connected adapted to contact with said faces and adapted to drive one of said wheels at various forward and backward speeds.

33. In a device of the class described the combination with a driven shaft of friction wheels thereon each having inwardly directed friction faces, one of said friction wheels having a friction flange, a shaft extending in the same general direction as the driven shaft, friction members thereon, one for each friction wheel and extending between the friction faces, means adapted to shift said friction members to contact with said friction faces and to neutral position, a friction wheel on the shaft adjacent said friction flange and means adapted to shift said flange to engage said last named friction wheel when the friction members are in neutral position.

34. In a mechanism of the class described the combination with a rotatable shaft of friction wheels thereon one of which is rotatable with the shaft and the other movable relatively and longitudinally of the shaft, said wheels having friction faces directed in approximately the direction of the axis of rotation thereof, a shaft adjacent the rotatable shaft, friction members thereon extending between the faces on said friction wheels, means adapted to oscillate said friction members to contact said faces and means adapted to move said friction members in the same plane.

35. In a device of the class described the combination with a rotatable shaft of a plurality of inwardly facing friction wheels thereon, frictional means adapted to connect the same for speeds ahead and reverse speeds and a friction wheel on the shaft adapted to be engaged by one of the inwardly facing friction wheels to drive at shaft speed.

36. In a device of the class described the combination with a driven shaft, of friction wheels engaged thereon, each of which have friction faces directed at angles therewith, a shaft journaled adjacent said driven shaft, friction members thereon one for each friction wheel, a lever, operative connections between the same and said friction members whereby actuation of the lever shifts the friction members to contact the friction faces for speed in one direction, a lever adjacent said lever, operative connections between the same and friction members whereby the friction members are shifted for speeds in another direction.

37. In a device of the class described the combination with shafts of friction wheels on one having inwardly directed friction faces, friction members on the other shaft, one for each friction wheel and adapted to extend between the friction faces on the same wheel, means adapted to move said friction members oppositely to contact the faces of said friction wheels for speeds in one direction and means adapted to shift said friction members in the same direction to contact said friction faces thereby imparting motion in another direction.

38. In a device of the class described the combination with a driven shaft of a plurality of friction wheels thereon each provided with a plurality of frictional contact faces, a shaft journaled adjacent the driven shaft, friction members thereon, one for each friction wheel between the faces of which the same is positioned, means simultaneously depressing one of said friction members and elevating the other to engage the friction faces and means adapted to elevate said friction members simultaneously and to depress the same simultaneously to contact the friction faces.

39. In a device of the class described the combination with shafts, friction wheels on one of the same each provided with inwardly directed faces and one having an outwardly directed friction face, friction members on one of said shafts one for each wheel and adapted to contact either of the friction faces on its corresponding friction wheel, a friction element on one of said shafts and means shifting said friction wheel having the outwardly directed friction face to contact the friction element.

40. In a device of the class described the combination with rotatable shafts each having a plurality of friction members thereon, means rocking some of said friction members to contact the others for speeds in one direction, means shifting the same friction members simultaneously in the same direction for speed in the opposite direction, and a friction member on one of said shafts adapted to contact with one of the aforesaid friction members.

In testimony whereof I have hereunto subscribed my name in the presence of two subscribing witnesses.

GEORGE W. MARBLE.

Witnesses:
C. W. HILLS,
W. W. WITHENBURY.